(12) United States Patent
Chang

(10) Patent No.: US 10,017,183 B2
(45) Date of Patent: Jul. 10, 2018

(54) METHOD AND APPARATUS FOR CONTROLLING RESTART OF VEHICLE HAVING ISG-AUTO HOLD SYSTEM

(71) Applicant: Hyundai Motor Company, Seoul (KR)

(72) Inventor: Hwi-Bong Chang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/335,698

(22) Filed: Oct. 27, 2016

(65) Prior Publication Data

US 2017/0267243 A1 Sep. 21, 2017

(30) Foreign Application Priority Data

Mar. 15, 2016 (KR) ........................ 10-2016-0030952

(51) Int. Cl.
*B60W 30/18* (2012.01)
*F02N 11/08* (2006.01)
(Continued)

(52) U.S. Cl.
CPC ...... *B60W 30/18054* (2013.01); *B60W 10/06* (2013.01); *B60W 10/11* (2013.01); *B60W 10/184* (2013.01); *F02N 11/0814* (2013.01); *F02N 11/0822* (2013.01); *B60W 2510/0208* (2013.01); *B60W 2510/1005* (2013.01); *B60W 2510/182* (2013.01); *B60W 2520/04* (2013.01); *B60W 2520/10* (2013.01); *B60W 2540/10* (2013.01); *B60W 2540/12* (2013.01); *B60W 2710/1005* (2013.01); *F02N 11/04* (2013.01); *F02N 2200/0801* (2013.01); *F02N 2200/0802* (2013.01); *F02N 2200/101* (2013.01); *F02N 2200/102* (2013.01); *F02N 2200/103* (2013.01); *Y02T 10/48* (2013.01)

(58) Field of Classification Search
None
See application file for complete search history.

(56) References Cited

U.S. PATENT DOCUMENTS

2004/0038774 A1* 2/2004 Kuroda ................. B60K 6/485
477/3
2006/0166789 A1* 7/2006 Katou .................. B60W 10/06
477/167
(Continued)

FOREIGN PATENT DOCUMENTS

JP 2006-131121 A 5/2006
JP 2010-143542 A 7/2010
(Continued)

*Primary Examiner* — Justin Holmes
(74) *Attorney, Agent, or Firm* — Mintz Levin Cohn Ferris Glovsky and Popeo, P.C.; Peter F. Corless

(57) ABSTRACT

A method for controlling restart of a vehicle is provided. The method includes allowing the vehicle to enter into an ISG state and allowing the vehicle to actuate the Auto Hold. Whether the vehicle fulfills a condition for releasing the Auto Hold is then determined and operation of the Auto Hold is released in response to determining that the vehicle fulfills the condition for releasing the Auto Hold. Additionally, the method includes determining whether the vehicle fulfills a condition for releasing the ISG and releasing the ISG and restarting an engine in response to determining that the vehicle fulfills the condition for releasing the ISG.

19 Claims, 8 Drawing Sheets

(51) Int. Cl.
*B60W 10/06* (2006.01)
*B60W 10/11* (2012.01)
*B60W 10/184* (2012.01)
*F02N 11/04* (2006.01)

(56) References Cited

U.S. PATENT DOCUMENTS

2013/0296121 A1* 11/2013 Gibson ................ F02D 41/022
          477/5
2013/0296122 A1* 11/2013 Banker ............... B60W 10/196
          477/5
2013/0297191 A1* 11/2013 Gibson ............... F02N 11/0855
          701/112
2014/0142795 A1*  5/2014 Akebono ................ B60K 6/48
          701/22
2016/0194007 A1*  7/2016 Furuya ................. B60W 10/02
          477/174

FOREIGN PATENT DOCUMENTS

| JP | 2014-152741 A | 8/2014 |
| JP | 2015-101127 A | 6/2015 |
| JP | 2015-101976 A | 6/2015 |
| JP | 2015-111412 A | 6/2015 |

* cited by examiner

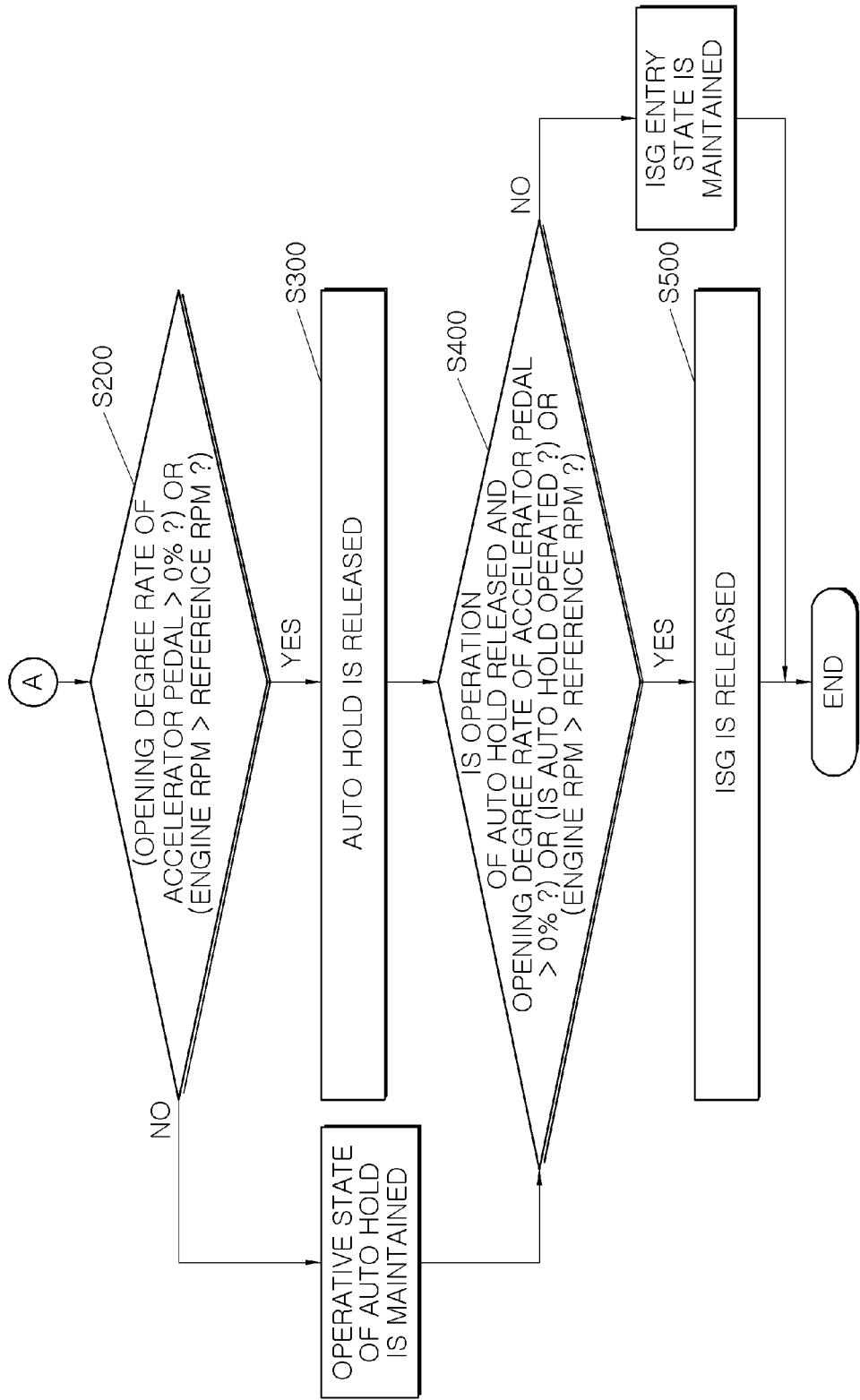

METHOD AND APPARATUS FOR CONTROLLING RESTART OF VEHICLE HAVING ISG-AUTO HOLD SYSTEM

CROSS-REFERENCE TO RELATED APPLICATIONS

This application claims priority to Korean Patent Application No. 10-2016-0030952 filed on Mar. 15, 2016, which is incorporated herein by reference in its entirety.

BACKGROUND

Field of the Invention

The present invention relates to a method and apparatus for controlling restart of a vehicle equipped with an idle stop and go (ISG) Auto Hold system, and more particularly, to a method and apparatus for controlling restart of a vehicle equipped with an ISG-Auto Hold system, which allows drivers to operate the vehicle instantaneously to reduce risk of accident.

Description of the Related Art

Vehicles that have been launching recently are equipped with an engine to which an ISG system is applied to improve fuel efficiency and reduce emissions. The ISG system is an engine control system that shuts off the engine automatically, which is referred to "Idle Stop," when the driver engages a brake pedal under an idle state of the engine, and then turns on the engine automatically for the vehicle to run normally, which is referred to "Go," when the driver engages an accelerator pedal and thereby an engine restart request by the driver's intention occurs.

In general, ISG entry condition for shutting off the engine includes engagement of the brake pedal under the standstill state when no vehicle speed is detected (e.g., the vehicle speed is 0). When such an ISG entry condition is fulfilled, control for shutting off the engine is performed by stopping fuel supply and ignition. Further, when the driver's request for restarting the engine (i.e., request for starting the vehicle) such as operation of an accelerator pedal, release of a brake pedal, operation of a clutch pedal and the like is detected, control for restarting the engine, which turns on the engine again for the vehicle to run normally, is performed. Vehicles equipped with this ISG system may achieve the effect of increasing fuel efficiency by about 5 to 15%.

In addition, an Auto Hold system that is often mounted on vehicles having been launched recently is referred to a type of convenient system for securing driver's driving convenience and safety of driving, which eliminates inconvenience that the driver must continuously engage a brake pedal by maintaining pressure on the brake pedal while the vehicle stops. When the brake pedal is depressed or engaged in drive range (D range) and then the vehicle stops, a brake sensor is configured to detect the pedal engagement and transmit a signal corresponding thereto to a controller, and the controller is configured to actuate a solenoid valve in response to the signal to maintain hydraulic pressure of a master cylinder, and thus, the vehicle maintain the engagement of the brake pedal even when the driver releases the brake pedal after few seconds.

Accordingly, the Auto Hold system has an advantage in that it allows the driver's foot to relax by maintaining brake pressure and allows the vehicle to restart without rolling backward on an uphill road or a heavy slope way. It follows that the brake pressure of the vehicle is maintained by operation of the Auto Hold system, and then the brake pressure is released automatically when the accelerator pedal is depressed.

In vehicles equipped with both an ISG system and an Auto Hold system (hereinafter, the "vehicle equipped with an ISG-Auto Hold system"), when the brake pedal is depressed under an idle state, the engine is shut off by the ISG and the vehicle is maintained stationary by the Auto Hold. Thereafter, when the accelerator pedal is depressed, the Auto Hold is released and the engine is turned on, to thus improve functions driver's convenience and fuel efficiency may be improved.

In vehicles equipped with a conventional ISG-Auto Hold system as described above, the ISG maintains the engine turned on when the vehicle maintains the engagement of the brake pedal (i.e., state that the Auto Hold is turned on), or when the vehicle is under running (i.e., state that the Auto Hold is turned off and an opening degree rate of an accelerator pedal is greater than 0%), while the ISG forces the engine to turn off when the above conditions are not fulfilled. In other words, the state that the Auto Hold is turned on is a safe state, while the state that the Auto Hold is turned off and the opening degree rate of the accelerator pedal is greater than 0% is a relatively safe state since the driver has an intention to drive the vehicle. Therefore, restarting is permitted only under the safe state as described above.

Further, when the opening degree rate of the accelerator pedal is 0% (e.g., the pedal is disengaged) under the state that a drive gear is input (D range) and the Auto Hold is turned off, it is a state that the driver is looking at another place, not towards the front of the vehicle (e.g., situation that the driver is looking at a rear seat). Accordingly, when the engine is turned on, an accident may occur due to the forward movement of the vehicle. Therefore, to avoid such a situation, when the driver has no intention to drive the vehicle (i.e., if the opening degree rate of the accelerator pedal is 0%), the engine may be forcedly turned off.

However, in vehicles equipped with such conventional ISG-Auto Hold system as mentioned above, when the driver slightly steps on the accelerator pedal (e.g., an initial engagement of the pedal) and immediately releases the accelerator pedal under the state that the engine is turned off and the vehicle is maintained stationary by operation of the Auto Hold and ISG, various problems may occur. In other words, when the accelerator pedal is depressed slightly, the Auto Hold may be released. However, when the accelerator pedal is released immediately after depressing the accelerator pedal, the opening degree rate of the accelerator pedal is 0% and thus, the engine will not be restarted by the ISG system. In particular, the driver expects that the engine has been restarted, but the engine has not been restarted differently from the driver's expectation. Accordingly, there have been problems that since the driver cannot perform an instantaneous control to the vehicle, discomfort of the driver is weighted and risk of accident is increased.

SUMMARY

The present invention provides a method and apparatus for controlling restart of a vehicle equipped with an ISG and auto-hold system that allows the vehicle to be restarted by an ISG system even when the driver slightly steps on an accelerator pedal and immediately releases the accelerator pedal.

Other objects and advantages of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with an exemplary embodiment of the present invention, the present invention provides a method for controlling restart of a vehicle equipped with an ISG and auto-hold system that may include: allowing the vehicle to enter into an ISG state and allowing the vehicle to actuate an auto-hold (S100); determining whether the vehicle fulfills a condition for releasing the auto-hold (S200); releasing operation of the auto-hold in response to determining that the vehicle fulfills the condition for releasing the auto-hold (S300); determining whether the vehicle fulfills a condition for releasing the ISG (S400); and releasing the ISG and restarting an engine in response to determining that the vehicle fulfills the condition for releasing the ISG (S500).

According to an exemplary embodiment of the present invention, the condition for releasing the ISG is a condition in which the operation of the Auto Hold is released and the clutch is released, or the operation of the Auto Hold is maintained. Additionally, the condition for releasing the Auto Hold is a condition in which an opening degree rate of an accelerator is greater than 0%.

The condition for releasing the ISG is a condition in which the operation of the Auto Hold is released and the opening degree rate of the accelerator pedal is greater than 0%, or the operation of the Auto Hold is maintained, or an engine revolutions per minute (RPM) exceeds a preset reference RPM. The condition for releasing the Auto Hold is a condition in which the opening degree rate of the accelerator pedal is greater than 0% and the engine RPM exceeds the preset reference RPM.

Further, the process of allowing the vehicle to enter into an ISG state and allowing the vehicle to actuate an auto-hold may include inputting a gear shift stage into drive range (i.e., D range) (S110); actuating a brake pedal of the vehicle (S120); determining whether the vehicle fulfills an ISG entry condition under which the engine is stopped when the vehicle stops (S130); stopping the engine of the vehicle when the vehicle fulfills the ISG entry condition (S140); determining whether the vehicle fulfills the Auto Hold operation condition for maintaining the operative state of the brake pedal (S150); and maintaining the operative state of the brake pedal when the vehicle fulfills the Auto Hold operation condition (S160).

According to an exemplary embodiment of the present invention, the ISG entry condition is a condition in which the vehicle stops and the brake pedal of the vehicle is operated. The Auto Hold operation condition is a condition in which the vehicle speed is less than a preset reference speed and pressure of the brake is greater than a preset reference pressure. Additionally, a storage medium is provided to store logic for executing a method for controlling restart of a vehicle equipped with an ISG-Auto Hold system.

In accordance with another exemplary embodiment of the present invention, the present invention provides an apparatus for controlling restart of a vehicle equipped with an ISG-Auto Hold system that may include: the storage medium 100; a sensing unit 200 configured to sense vehicle speed, a gear shift stage, whether an accelerator pedal and a brake pedal are engaged, and whether a clutch is released; a controller 300 configured to operate the vehicle according to the method for controlling restart of a vehicle equipped with an ISG-Auto Hold system, of which logic is stored in the storage medium 100, using the sensed vehicle speed, the sensed state of the gear shift stage, the sensed state whether the accelerator pedal and the brake pedal are engaged, and the sensed state whether the clutch is released; an engine 400 stopped or restarted by the controller 300; and a brake 500 forced to be under Auto Hold or released from the Auto Hold by the controller 300.

According to an exemplary embodiment of the present invention, the sensing unit 200 may include a vehicle speed sensing unit 210 configured to detect speed of the vehicle; a gear shift stage sensing unit 220 configured to detect whether the gear shift stage of the vehicle is in drive range (i.e., D range); an accelerator pedal operation sensing unit 230 configured to detect an opening degree rate of the accelerator pedal and whether the accelerator pedal is engaged; a brake pedal operation sensing unit 240 configured to detect pressure of the brake pedal and whether the brake pedal is engaged; and a clutch state sensing unit 250 configured to detect whether the clutch is released.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1A:
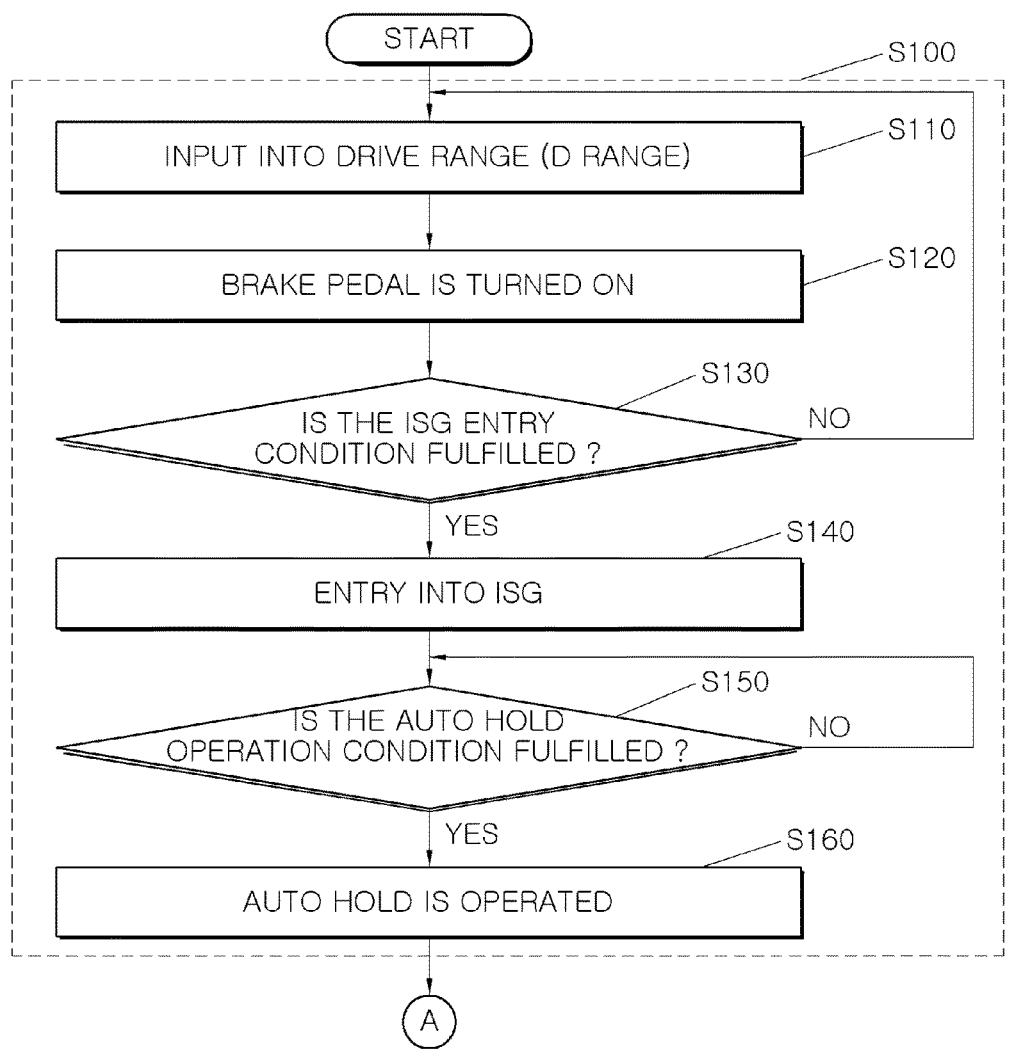
FIGS. 1A-3B are flow charts of a method for controlling restart of a vehicle equipped with an ISG-Auto Hold system, according to an exemplary embodiment of the present invention.
Figure 1B:
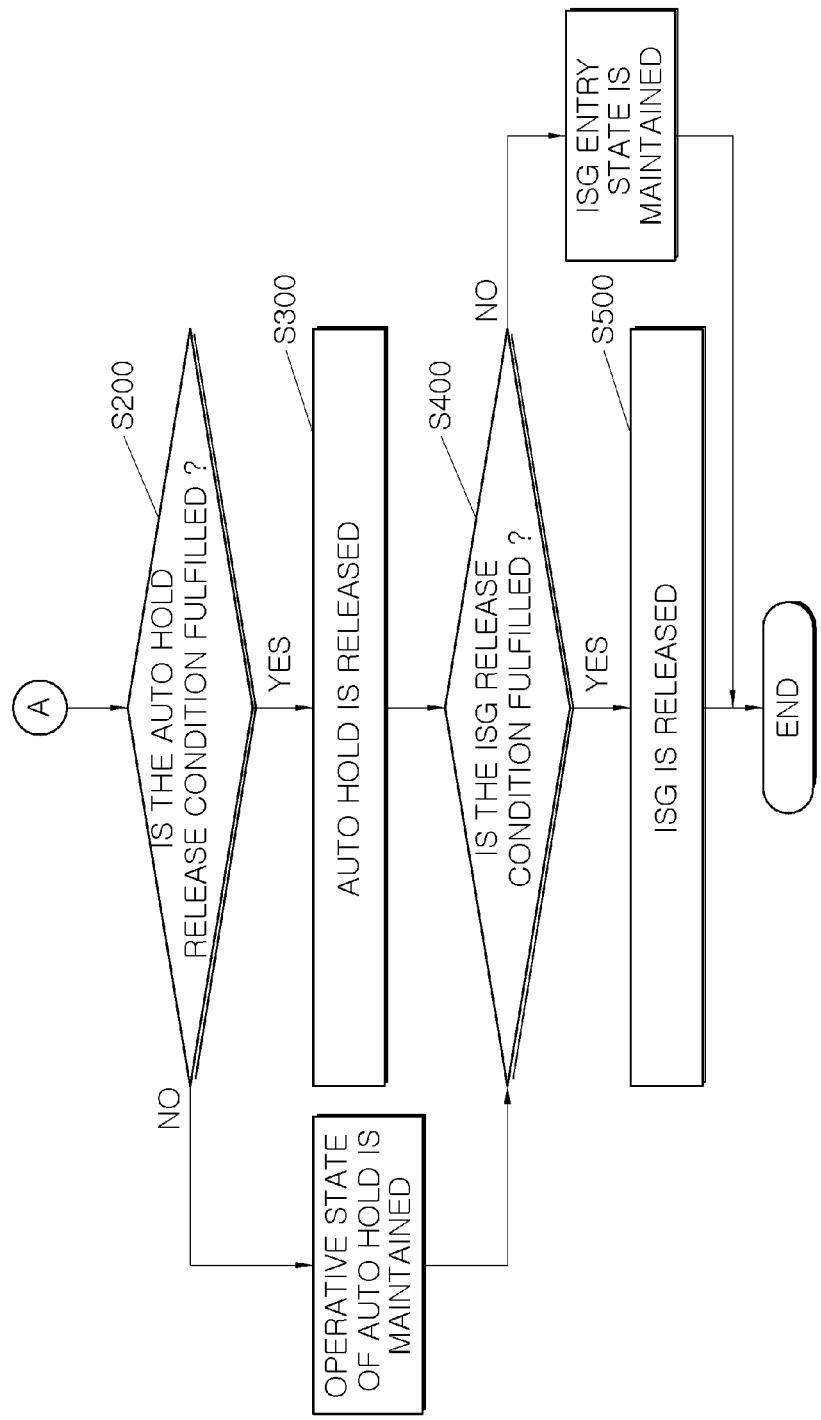

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The terms and words used in the specification and claims should not be construed as their ordinary or dictionary sense. On the basis of the principle that the inventor can define the appropriate concept of a term to describe his/her own invention in the best way, it should be construed as meaning and concepts for complying with the technical idea of the present invention. Accordingly, the exemplary embodiments described in the present specification and the construction shown in the drawings are nothing but one preferred embodiment of the present invention, and it does not cover all the technical ideas of the invention. Thus, it should be understood that various changes and modifications may be made at the time of filing the present application. In addition, detailed descriptions of functions and constructions well known in the art may be omitted to avoid unnecessarily obscuring the gist of the present invention. Exemplary embodiments of the present invention will be described below in more detail with reference to the accompanying drawings.

FIGS. 1A-3B are flow charts of a method for controlling restart of a vehicle equipped with an ISG-Auto Hold system, according to an exemplary embodiment of the present invention. Referring to FIGS. 1A-1B, a method for controlling restart of a vehicle equipped with an ISG-Auto Hold system according to an exemplary embodiment of the present invention may include an entry and actuating step S100; a first determination step S200; an Auto Hold release step S300; a second determination step S400; and an ISG release step S500. The various steps may be executed by a controller having a processor and a memory.

In particular, the method may include allowing the vehicle to enter into the ISG and allowing the vehicle to actuate the Auto Hold (S100 entry and actuating step). The process of allowing the vehicle to enter into the ISG and allowing the vehicle to actuate the Auto Hold may further include: inputting a gear shift stage into drive range (i.e., D range) (S110); actuating a brake pedal of the vehicle (S120); determining whether the vehicle fulfills an ISG entry condition under which the engine is stopped when the vehicle stops (S130); stopping the engine of the vehicle when the vehicle fulfills the ISG entry condition (S140); determining whether the vehicle fulfills the Auto Hold operation condition for maintaining the operative state of the brake pedal (S150); and maintaining the operative state of the brake pedal when the vehicle fulfills the Auto Hold operation condition (S160).

The ISG entry condition is a condition in which the vehicle is stationary (i.e., vehicle speed=0 km/h) and the brake pedal is operated or engaged. Further, the Auto Hold operation condition is a condition in which the vehicle speed is less than a preset reference speed and pressure of the brake is greater than a preset reference pressure. The preset reference vehicle speed may be set to about 0.45 km/h and the preset reference pressure may be set to about 3 bar. However, they are not necessarily limited to those values and may be set differently based on the intention of designers. Specifically, the vehicle may stop and may be maintained stationary (i.e., Auto Hold is turned on) and the engine may be turned off (i.e., the vehicle enters into the ISG).

Further, the method may include determining whether the vehicle fulfills a condition for releasing the Auto Hold (S200 first determination step). In particular, in response to determining that the vehicle does not fulfill the condition for releasing the Auto Hold, the operative state of the Auto Hold may be maintained. The operation of the Auto Hold may be released in response to determining that the vehicle fulfills the condition for releasing the Auto Hold (S300).

Particularly, the method may include determining whether the vehicle fulfills a condition for releasing the ISG (S400 second determination step). At this time, in response to determining that the vehicle does not fulfill the condition for releasing the ISG, the control method according to the present invention may end with the ISG entry state (i.e., state that the engine is turned off) maintained. In response to determining that the vehicle fulfills the condition for releasing the ISG, the method may include releasing the ISG and restarting the engine (S500 ISG release step).

Figure 2A:
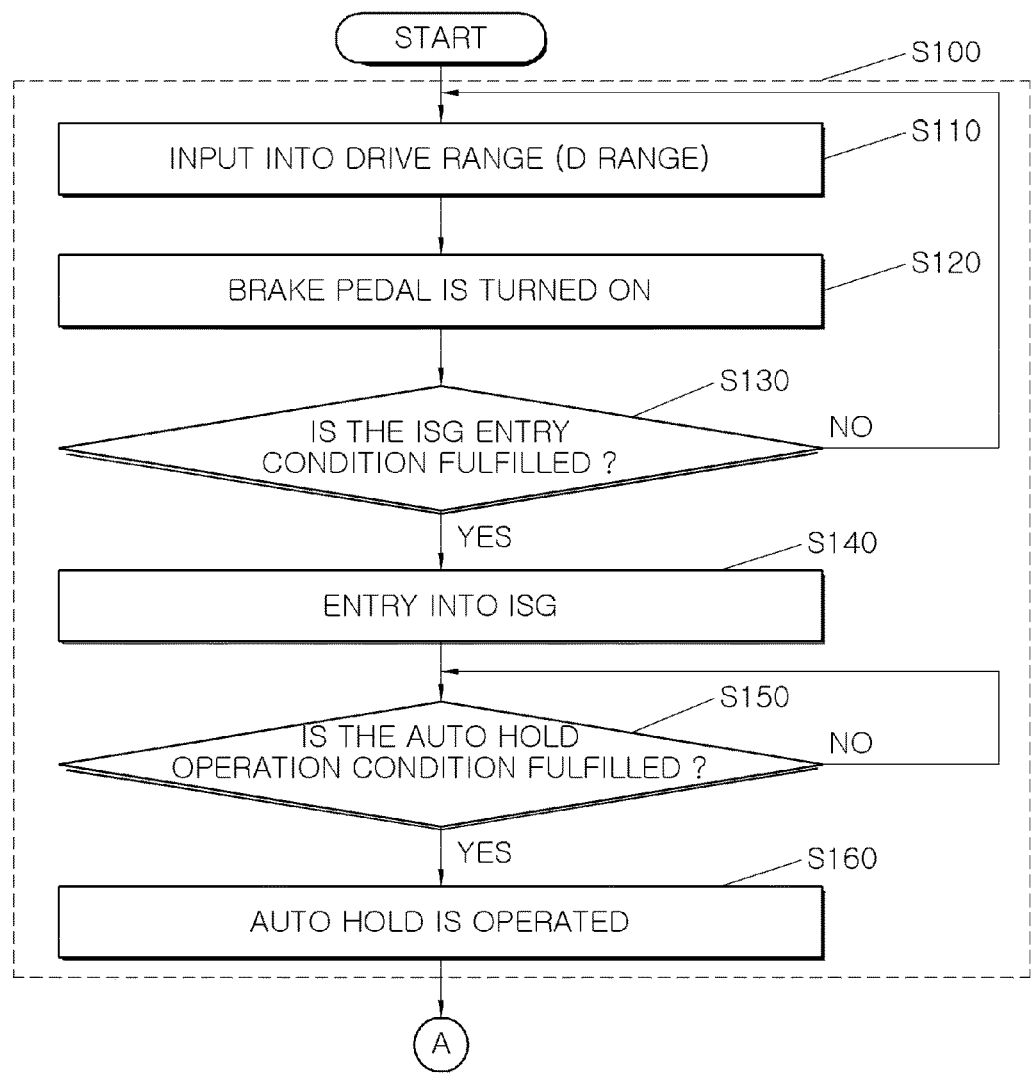
Figure 2B:
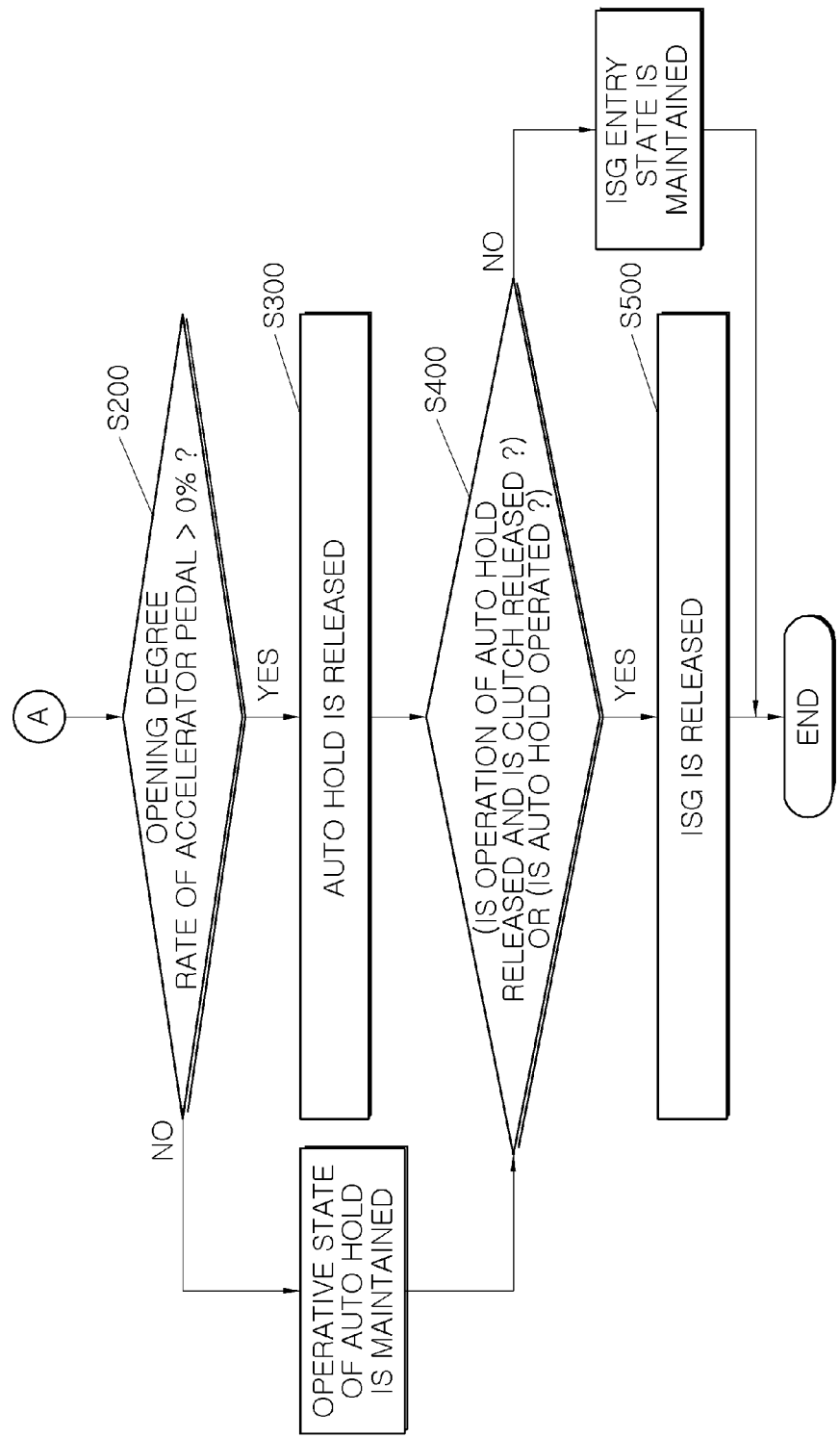

In a method for controlling restart of a vehicle equipped with an ISG and Auto Hold system, according to a first exemplary embodiment of the present invention, the condition for releasing the Auto Hold is a condition in which an opening degree rate of an accelerator pedal is greater than 0% and the condition for releasing the ISG is a condition in which the operation of the Auto Hold is released and the clutch is released, or the operation of the Auto Hold is maintained (see FIGS. 2A-2B).

In other words, when the clutch is released, operation of the Auto Hold may be released, and power is not transmitted to wheels of the vehicle even when the engine is restarted resulting from release of the ISG differently from that taught in the prior art. Therefore, since the vehicle cannot move forward under such state, when the driver does not have an intention to move the vehicle, an accident due to the forward movement of the vehicle may be prevented. At this time, whether the clutch is released may be detected by the clutch state sensing unit 250 via controller area network (CAN) communication, as described below.

More specifically, when the vehicle stops and is maintained stationary (i.e., Auto Hold is turned on) and the engine is turned off (i.e., the vehicle enters into ISG) (see step S100), when the driver engages (e.g., exerts pressure onto) the accelerator pedal slightly (e.g., initial engagement), the opening degree rate of the accelerator pedal becomes greater than 0% and thus, the Auto Hold may be released (see steps S200 and S300). Thereafter, when the clutch is released even when the driver disengages the accelerator pedal (e.g., the exerted pressure on the pedal is released), the ISG may be released and the engine may be restarted (see steps S400 and S500). In other words, even when the driver initially engages the accelerator pedal and then disengages the accelerator pedal and the engine is turned off and the vehicle is maintained stationary by operation of the Auto Hold and ISG, when the clutch is released, the ISG may be released and the engine may be restarted. In particular, since the vehicle may be restarted as the driver's expectation, the driver may perform instantaneous control to the vehicle thus preventing an accident risk.

Figure 3A:
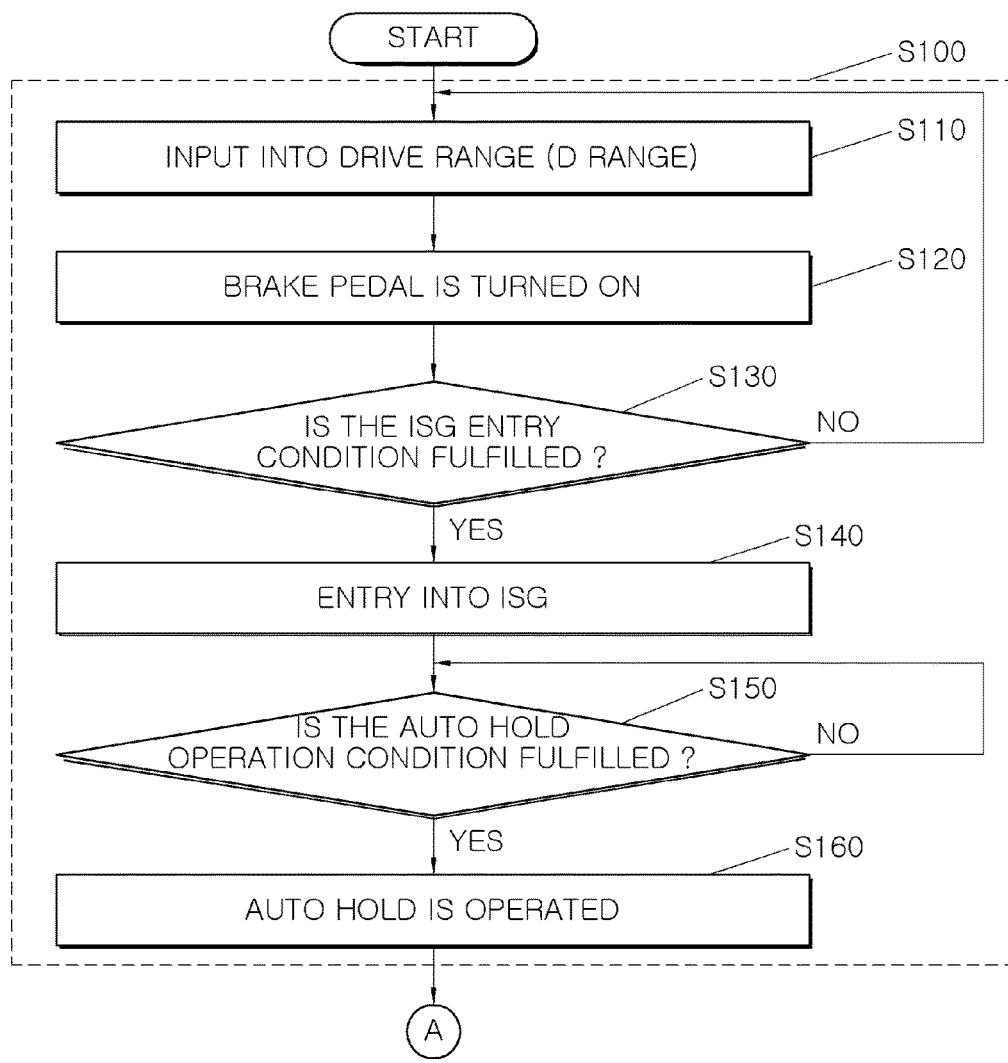

In a method for controlling restart of a vehicle equipped with an ISG-Auto Hold system, according to a second exemplary embodiment of the present invention, the condition for releasing the Auto Hold is a condition in which the opening degree rate of the accelerator pedal is greater than 0% and an engine RPM exceeds a preset reference RPM, and the condition for releasing the ISG is a condition in which the operation of the Auto Hold is released and the opening degree rate of the accelerator pedal is greater than 0%, or the operation of the Auto Hold is maintained, or the engine RPM exceeds a preset reference RPM (see FIG. 3). The preset reference RPM may be set to about 300 RPM, but not necessarily limited to thereto and may be set differently based on the intention of designers.

In other words, differently from prior art, the condition for releasing the Auto Hold may be set as a condition that the opening degree rate of the accelerator pedal is greater than 0% and the engine RPM exceeds the preset reference RPM, and thus, when the engine RPM is less than the preset reference RPM even when the driver initially engages the accelerator pedal (e.g., initially exerts pressure onto the pedal), the Auto Hold may not be released. Therefore, since the vehicle is not capable of moving forward under such state, when the driver does not have an intention to move the vehicle, an accident due to the forward movement of the vehicle may be prevented.

Further, when the engine RPM is less than the preset reference RPM, the condition for releasing the Auto Hold may not be fulfilled, and therefore the Auto Hold may be maintained. Accordingly, the condition for releasing the ISG may be fulfilled and the engine may be restarted. In other words, when the engine RPM is less than the preset reference RPM, the Auto Hold may be maintained and thus the vehicle is not capable of moving forward, and therefore no risk of accident occurs. Therefore, restarting of the engine is permitted by releasing the ISG.

More specifically, when the vehicle stops and is maintained stationary (i.e., Auto Hold is turned on) and the engine is turned off (i.e., the vehicle enters into ISG) (see step S100), when the engine RPM is less than the preset reference RPM even when the driver initially engages the accelerator pedal, the Auto Hold may be maintained (see step S200). Accordingly, even when the driver disengages the accelerator pedal thereafter, the ISG may be released and the engine may be restarted (see steps S400 and S500). In other words, when the engine RPM is less than the preset reference RPM, the Auto Hold may be maintained and thus the vehicle is not capable of moving forward, and therefore no risk of accident occurs. Therefore, restarting of the engine is permitted by releasing the ISG.

Further, when the vehicle stops and is maintained stationary (i.e., Auto Hold is turned on) and the engine is turned off (i.e., the vehicle enters into ISG) (see step S100), when the driver depresses the accelerator pedal and thereby the engine RPM exceeds the preset reference RPM, the Auto Hold may be released (see steps S200 and S300). Thereafter, even when the driver disengages the accelerator pedal, when the engine RPM exceeds the preset reference RPM, the ISG may be released and the engine may be restarted (see steps S400 and S500). In particular, since the vehicle may be restarted as the driver's expectation, the driver may perform instantaneous control to the vehicle thus preventing an accident risk.

Figure 4:
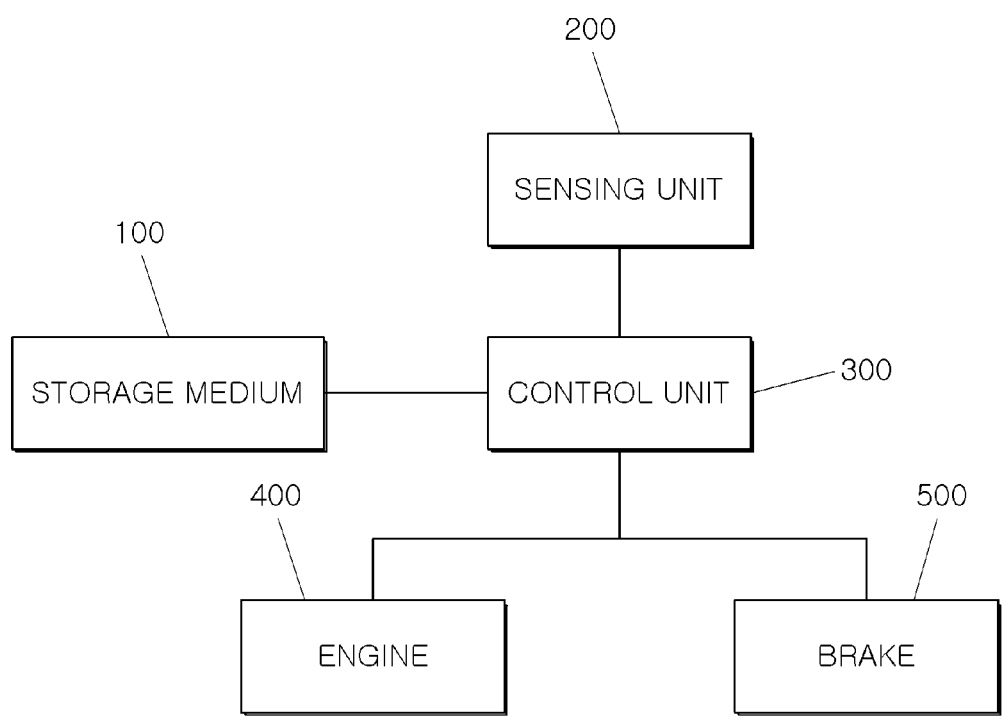
FIGS. 4 and 5 are block diagrams of an apparatus for controlling restart of a vehicle equipped with an ISG-Auto Hold system, according to an exemplary embodiment of the present invention.
Figure 5:
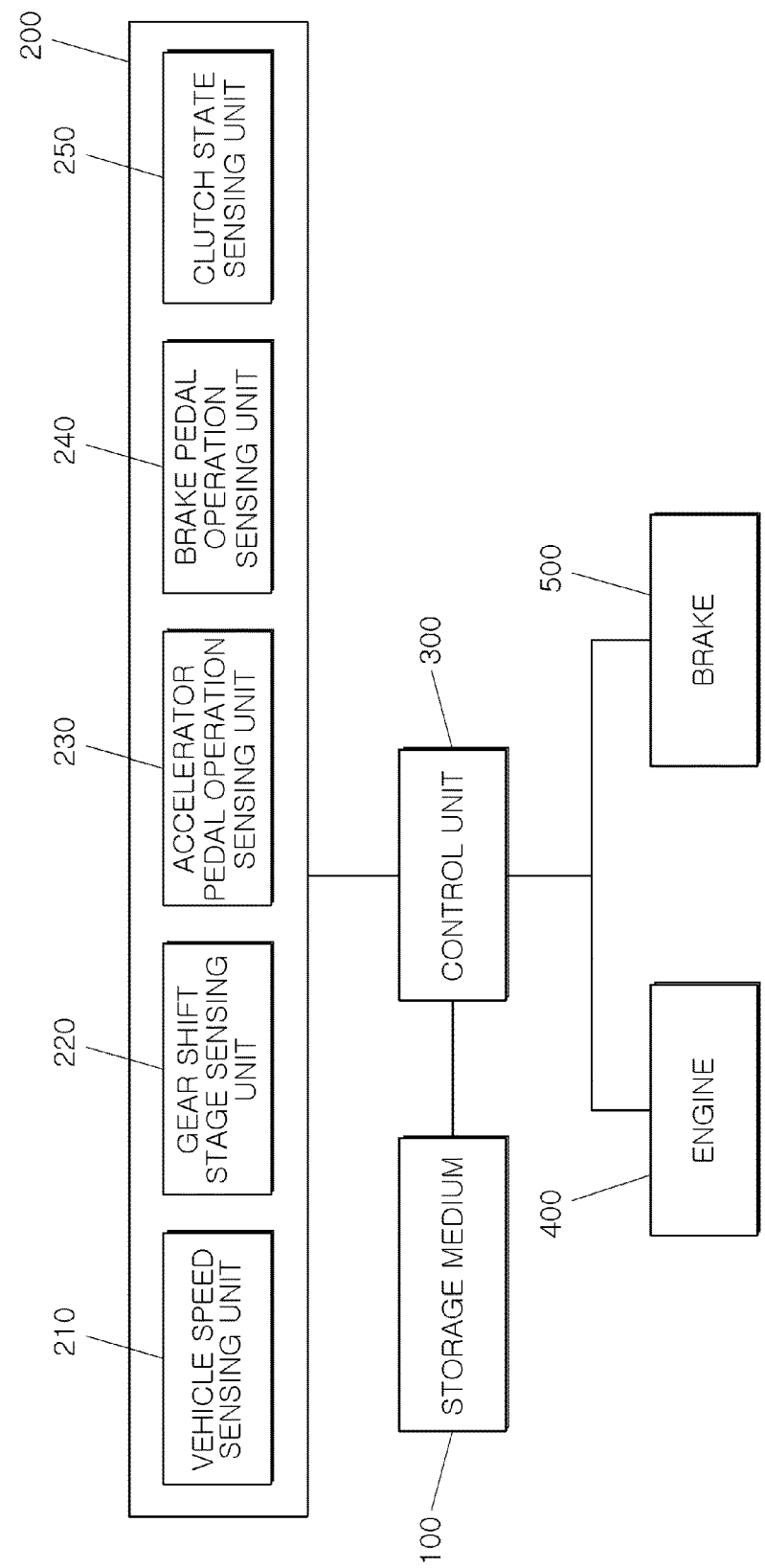

FIGS. 4 and 5 are block diagrams of an apparatus for controlling restart of a vehicle equipped with an ISG-Auto Hold system, according to an exemplary embodiment of the present invention. Referring to FIGS. 4 and 5, an apparatus for controlling a vehicle equipped with an ISG-Auto Hold system according to an exemplary embodiment of the present invention may include a storage medium 100, a sensing unit 200, a controller 300, an engine 400, and a brake 500. The controller 300 may be configured to operate the other components of the system. The storage medium 100 may be configured to logic or program instructions for executing the method for controlling restart of a vehicle equipped with an ISG-Auto Hold system.

The sensing unit 200 may be configured to detect vehicle speed, gear shift stage, whether an accelerator pedal and a brake pedal are engaged, and whether a clutch is released. Particularly, the sensing unit 200 may include a vehicle speed sensing unit 210 configured to detect speed of the vehicle; a gear shift stage sensing unit 220 configured to detect whether the gear shift stage of the vehicle is in drive range (i.e., D range); an accelerator pedal operation sensing unit 230 configured to detect an opening degree rate of the accelerator pedal and whether the accelerator pedal is engaged; a brake pedal operation sensing unit 240 configured to detect pressure exerted onto the brake pedal and whether the brake pedal is engaged; and a clutch state sensing unit 250 configured to detect whether the clutch is released.

The controller 300 may be configured to operate the vehicle according to the method for controlling a vehicle equipped with an ISG-Auto Hold system, of which logic is stored in the storage medium 100, using the sensed vehicle speed, the sensed state of the gear shift stage, the sensed state of whether the accelerator pedal and the brake pedal are engaged, and the sensed state of whether the clutch is released as detected by the sensing unit 200. The engine 400 may be stopped or restarted by the controller 300 while the brake 500 is forced to be under Auto Hold or released from the Auto Hold by the controller 300.

According to the present invention as discussed above, since restart of the vehicle by an ISG system may be performed even when the driver initially engages an accelerator pedal and immediately disengages the accelerator pedal, an accident risk may be reduced by the driver's instantaneous control to the vehicle. While the present invention has been described with respect to the specific exemplary embodiments, it will be apparent to those skilled in the art that various changes and modifications may be made without departing from the spirit and scope of the invention as defined in the following claims.

It should be noted that exemplary embodiments as described above are nothing but exemplary embodiments for allowing those skilled in the art to more easily implement the present invention and thus, the scope of the present invention is not limited to the exemplary embodiments as described above and the accompanying drawings. Therefore, it will be appreciated by those skilled in the art that various substitutions, modifications and changes to the present invention may be made without departing from the technical idea of the present invention and any part that can be easily changed by those skilled in the art fall within the scope of the present invention.

What is claimed is:

1. A method for controlling restart of a vehicle equipped with an idle stop and go (ISG) Auto Hold system, comprising:
   allowing, by a controller, the vehicle to enter into an ISG state and allowing the vehicle to actuate the Auto Hold;
   determining, by the controller, whether the vehicle fulfills a condition for releasing the Auto Hold;
   releasing, by the controller, operation of the Auto Hold in response to determining that the vehicle fulfills the condition for releasing the Auto Hold;
   determining, by the controller, whether the vehicle fulfills a condition for releasing the ISG; and
   releasing, by the controller, the ISG and restarting an engine in response to determining that the vehicle fulfills the condition for releasing the ISG.

2. The method of claim 1, wherein the condition for releasing the ISG is a condition in which the operation of the Auto Hold is released and the clutch is released, or the operation of the Auto Hold is maintained.

3. The method of claim 2, wherein the condition for releasing the Auto Hold is a condition in which an opening degree rate of an accelerator pedal is greater than 0%.

4. The method of claim 1, wherein the condition for releasing the ISG is a condition at least one selected from the group consisting of: the operation of the Auto Hold is released and the opening degree rate of the accelerator pedal is greater than 0%; the operation of the Auto Hold is maintained; and an engine revolutions per minute (RPM) exceeds a preset reference RPM.

5. The method of claim 4, wherein the condition for releasing the Auto Hold is a condition in which the opening degree rate of the accelerator pedal is greater than 0% and the engine RPM exceeds the preset reference RPM.

6. The method of claim 1, wherein the allowing the vehicle to enter into an ISG state and allowing the vehicle to actuate the Auto Hold includes inputting, by the controller, a gear shift stage into drive range (D range).

7. The method of claim 6, further comprising:
   actuating, by the controller, a brake pedal of the vehicle.

8. The method of claim 7, wherein the further comprising:
   determining, by the controller, when the vehicle fulfills an ISG entry condition under which the engine is stopped when the vehicle is stationary.

9. The method of claim 8, wherein the ISG entry condition is a condition in which the vehicle stops and the brake pedal of the vehicle is engaged.

10. The method of claim 8, further comprising:
    stopping, by the controller, the engine of the vehicle when the vehicle fulfills the ISG entry condition.

11. The method of claim 10, further comprising:
    determining, by the controller, when the vehicle fulfills the Auto Hold operation condition for maintaining the operative state of the brake pedal.

12. The method of claim 11, wherein the auto-hold operation condition is a condition in which the vehicle speed is less than a preset reference speed and pressure of the brake is greater than a preset reference pressure.

13. The method of claim 11, further comprising:
    maintaining, by the controller, the operative state of the brake pedal when the vehicle fulfills the Auto Hold operation condition.

14. An apparatus for controlling a vehicle equipped with an idle stop and go (ISG) Auto Hold system, comprising:
    a storage medium configured to store logic for executing a method for controlling restart of a vehicle equipped with an ISG-Auto Hold system;
    a sensing unit configured to detect vehicle speed, gear shift stage, when an accelerator pedal and a brake pedal are engaged, and when a clutch is released; and
    a controller configured to operate the vehicle according to the method for controlling a vehicle equipped with an ISG-Auto Hold system using the sensed vehicle speed, the sensed state of the gear shift stage, the sensed state of when the accelerator pedal and the brake pedal are engaged, and the sensed state of when the clutch is released.

15. The apparatus of claim 14, further comprising an engine that is stopped or restarted by the controller.

16. The apparatus of claim 15, further comprising a brake that is forced to be under Auto Hold or released from the Auto Hold by the controller.

17. The apparatus of claim 14, wherein the sensing unit includes:
    a vehicle speed sensing unit configured to detect the vehicle speed ; and
    a gear shift stage sensing unit configured to sense when the gear shift stage of the vehicle is in drive range (D range).

18. The apparatus of claim 17, wherein the sensing unit further comprises:
    an accelerator pedal operation sensing unit configured to detect an opening degree rate of the accelerator pedal and when the accelerator pedal is engaged; and
    a brake pedal operation sensing unit configured to detect pressure exerted onto the brake pedal and when the brake pedal is engaged.

19. The apparatus of claim 18, wherein the sensing unit further comprises:
    a clutch state sensing unit configured to detect when the clutch is released.

* * * * *